J. S. BROWN.
Horse Hay Fork.
No. 2,391. Reissued Nov. 6, 1866.
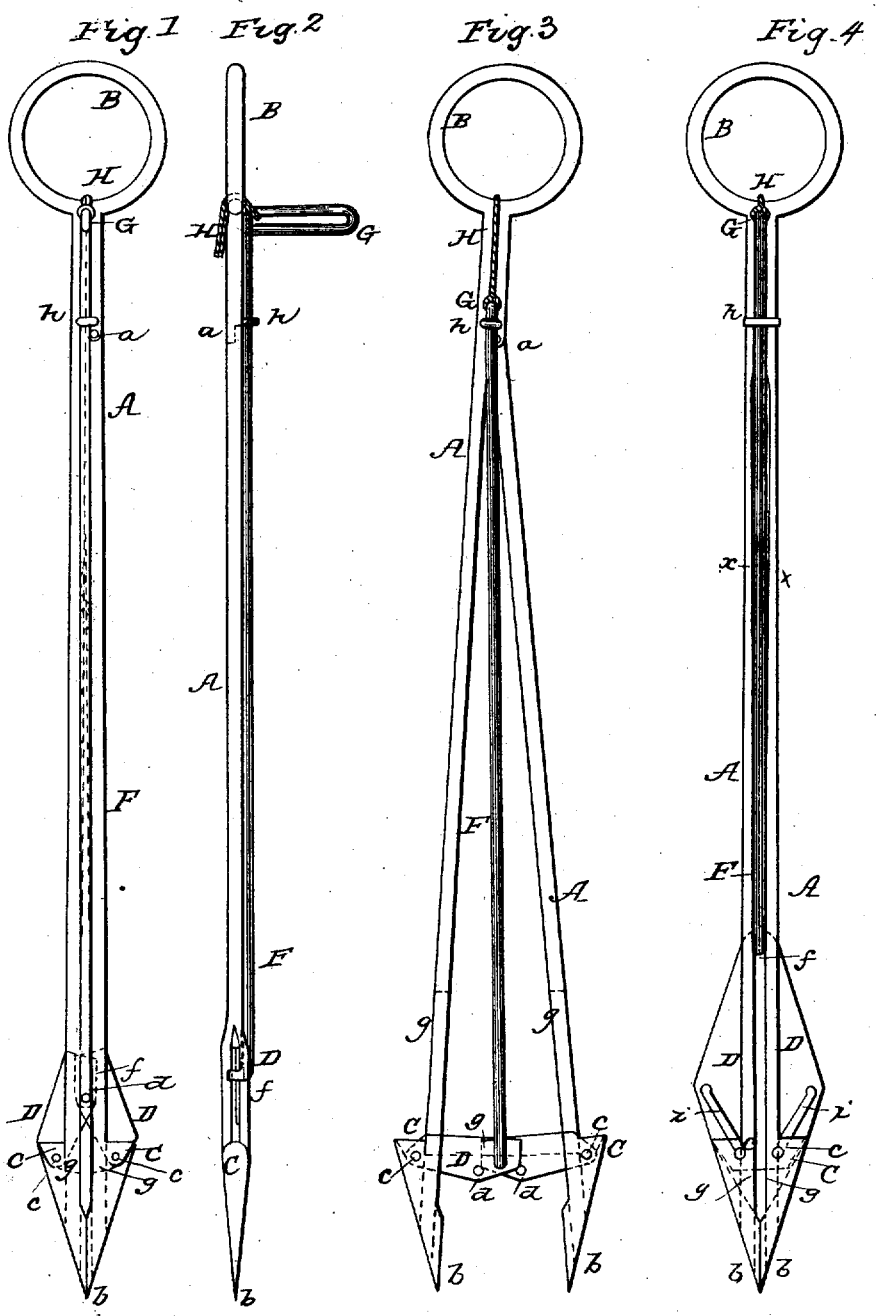
WITNESSES
Wm Frank
Thomas T. Parker
INVENTOR
J. S. Brown
N. PETERS, Photo-Lithographer, Washington, D. C.

UNITED STATES PATENT OFFICE.

J. S. BROWN, OF WASHINGTON, DISTRICT OF COLUMBIA.

IMPROVEMENT IN HORSE HAY-FORKS.

Specification forming part of Letters Patent No. 56,359, dated July 17, 1866; Reissue No. 2,391, dated November 6, 1866.

DIVISION A.

*To all whom it may concern:*

Be it known that I, J. S. BROWN, of Washington, in the county of Washington and District of Columbia, have invented a new and Improved Hay-Elevator; and I do hereby declare that the following is a full and exact description thereof, reference being had to the accompanying drawings, making part of this specification—

Figure 1 being a side view of the instrument when closed for piercing the hay, straw, or other fibrous material; Fig. 2, an edge view of the same, as in Fig. 1; Fig. 3, a side view of the same when spread open and its barbs or shoulders uncovered, as in the act of raising the hay; Fig. 4, a side view of the instrument closed, representing some modifications of construction and operation.

Like letters designate corresponding parts in all of the figures.

The instrument has a shaft, A, of suitable length and size, pointed at the lower end, *b*, and having a ring or hook, B, at the upper end, by which it is attached to the rope whereby it is lifted. These are essential structural parts of the instrument. It is inserted into the hay by piercing with its point *b*, and pushing at the ring B with the hands or foot.

When once it is inserted into the hay, it is necessary to apply some means to cause it to hold the hay and lift what is held. For this purpose I provide fixed barbs or shoulders C C on two opposite sides of the shaft, (one would less perfectly effect the purpose, and more than two might be used,) a few inches above the point *b*, abrupt, or about at right angles to the shaft, at the upper edges thereof, and sloping from their outer extremities to the point *b* of the shaft. The proportions of the parts may be about as shown in the drawings.

When the hay has been elevated to the place desired, it is necessary to remove the hold of the barbs C C from the hay. To effect this I cover them with bars D D, sloping or wedge-acting in form or position, substantially as shown in Fig. 1 or Fig. 4, or in an equivalent manner, so that the sloping or wedge position or form of the bars will allow the hay to slide off and become disengaged from the instrument. Then, after the instrument is again inserted into hay, and before the hay can be lifted, the barbs are to be uncovered by removing the bars from over them.

In order to cover and uncover the barbs or shoulders the bars or bar may have either of two motions—that is, either sliding or turning motion.

In Figs. 1, 2, and 3 the bars are represented as turning out and in around pivots *c c*, to cover and uncover the barbs or shoulders. In Fig. 4 a single wedge-bar, D, is used, sliding up and down, to accomplish the same purpose. In both cases the bars (or bar) are most properly raised to cover the barbs, and lowered to uncover them; but the reverse or a transverse movement might be adopted.

In order to actuate the bars or bar, a rod, F, or its equivalent, is employed, its lower end, *f*, being bent and inserted into holes *d d* of the bars, or otherwise connected therewith, and its upper end terminating in a handle or loop, G, for depressing and raising it. It is depressed by hand, and raised by a cord, H, or its equivalent, attached to the handle or loop of the rod, and extending thence up through the ring B of the shaft A, and then down to the attendant. A staple or band, *h*, through which the rod slides, near the upper end, keeps the rod in proper position.

I divide the shaft A, so that it may be opened at the lower end two or three inches, more or less, and gradually less thence toward the upper end, as shown in Fig. 3, so as to give the whole a dovetail or inverted wedge shape or outline after inserting into the hay, preparatory to lifting the hay, and then be closed again in the act of disengaging it from the hay, after elevating. It is to remain closed also while entering the hay. Its closed position is shown in Figs. 1, 2, and 4. In order thus to allow the shaft to open, one leg may be pivoted to the other near the upper end, as at *a*, Figs. 1, 2, and 3, or both legs may be flattened, as at *x x*, Fig. 4, toward the upper ends thereof, and downward, so that they will bend outward and spring inward.

In order to open the legs of the shaft, I employ the bars D D as toggle-bars, as in Figs. 1, 2, and 3, with round holes *d d* therein, as shown, or use the single wedge-bar D, with oblique slots *i i* or their equivalent, therein working over pins *c c*, substantially as shown in Fig. 4.

When the toggle-bars are employed, (as I prefer,) they are so arranged that when opened they will descend a little below the transverse line *y*, as shown in red, Fig. 3, from pivot to pivot, and thus they will lock the legs of the shaft apart. Then, by lifting the rod F with the slight force necessary till the end *f* ascends above the line *y*, the legs will automatically close together by the pressure of the hay itself. Different holes *d d* in the toggle-bars will enable the legs of the shaft to be separated more or less, according to the quality of the hay or its compactness. In both the toggle and the wedge arrangements the covering and uncovering bars may serve also to open and close the legs of the shaft.

In manufacturing, the shaft A may be made of a square rod of wrought-iron, (or the portions *x x*, Fig. 4, of cast-steel, when they are to bend,) about three-eighths or one-half of an inch square. The barbs C C may be welded on at the lower end, and also the point or points *b b* of cast-steel welded on, as shown, the red lines indicating the planes of welding. The legs are then split for the reception of the bars D D, which are halved together where they lap by each other. The barbs C C may be chamfered or rounded at the upper edge, so that the bars D D will cover them in a manner to leave no abrupt projections.

The advantages and superiority of this instrument are: While it operates with great ease and perfection, it is very simple and cheap in construction, having few parts, requiring comparatively very little material, and being very easy to form and construct, and quite free from liability to break or get out of repair, for, as will be seen, there is no leverage of strain thrown upon any part, the hay acting simply by weight and compression upon it, and the act of moving the bars D D being directly and immediately thereto, near the lower end of the instrument.

What I claim as my invention, and desire to secure by Letters Patent, is—

The employment of a movable bar or bars, D D, to cover and uncover fixed barbs or shoulders C C, in combination with a divided shaft, A, to be opened in dovetail or inverted wedge form, and closed, in connection with the uncovering and covering of the barbs or shoulders, substantially as and for the purposes herein specified.

J. S. BROWN.

Witnesses:
EDM. F. BROWN,
THOS. T. PARKER.